(12) United States Patent
Jikumaru et al.

(10) Patent No.: US 11,458,998 B2
(45) Date of Patent: Oct. 4, 2022

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Akitoshi Jikumaru, Nisshin (JP); Atsuko Kobayashi, Nagoya (JP); Kenji Fujihara, Nagoya (JP); Mizuki Kiuchi, Toyota (JP); Takashi Yamazaki, Nagoya (JP); Masayuki Goto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 16/842,895

(22) Filed: Apr. 8, 2020

(65) Prior Publication Data
US 2020/0369298 A1  Nov. 26, 2020

(30) Foreign Application Priority Data

May 23, 2019 (JP) .............................. JP2019-096796

(51) Int. Cl.
*B60W 60/00* (2020.01)
*G05D 1/02* (2020.01)
*G05D 1/00* (2006.01)

(52) U.S. Cl.
CPC ..... *B60W 60/00253* (2020.02); *G05D 1/0088* (2013.01); *G05D 1/0212* (2013.01); *B60W 2540/041* (2020.02); *G05D 2201/0213* (2013.01)

(58) Field of Classification Search
CPC ...... B60W 60/00253; B60W 2540/041; G05D 1/0088; G05D 1/0212
USPC .......................................................... 701/24
See application file for complete search history.

(56) References Cited

U.S. PATENT DOCUMENTS

| 2016/0332535 | A1* | 11/2016 | Bradley ............... G05D 1/0212 |
| 2018/0114259 | A1* | 4/2018 | Ross ......................... G08G 1/20 |
| 2018/0364738 | A1* | 12/2018 | Bridges ................ G05D 1/0287 |
| 2019/0086223 | A1* | 3/2019 | Tanaka ............. G08G 1/096872 |
| 2019/0294129 | A1* | 9/2019 | Muta ................... B60H 1/00657 |
| 2020/0149902 | A1 | 5/2020 | Fujimoto |
| 2020/0175558 | A1 | 6/2020 | Fujimoto et al. |
| 2021/0150656 | A1 | 5/2021 | Yasui et al. |

FOREIGN PATENT DOCUMENTS

| JP | H09-183334 A | 7/1997 |
| JP | 2002-063695 A | 2/2002 |
| WO | 2018/230676 A1 | 12/2018 |
| WO | 2018/230677 A1 | 12/2018 |
| WO | 2019/004475 A1 | 1/2019 |

* cited by examiner

*Primary Examiner* — Yazan A Soofi
(74) *Attorney, Agent, or Firm* — Oliff PLC

(57) ABSTRACT

A control unit of a server device as an information processing apparatus is configured to: provide first information on a service for each of a plurality of moving objects, each of which is configured to provide a different service and autonomous travel; acquire second information on time and location of at least one service that a user wants to use; and determine at least one moving object that matches with the user based on the first information and the second information, and generate a travel plan of the at least one moving object.

10 Claims, 7 Drawing Sheets

INFORMATION PROCESSING APPARATUS, INFORMATION PROCESSING METHOD AND NON-TRANSITORY STORAGE MEDIUM

CROSS-REFERENCE TO RELATED APPLICATION

This application claims priority to Japanese Patent Application No. 2019-096796 filed on May 23, 2019, incorporated herein by reference in its entirety.

BACKGROUND

1. Technical Field

The present disclosure relates to an information processing apparatus, an information processing method executed by the information processing apparatus, and a non-transitory storage medium.

2. Description of Related Art

JP-A-9-183334 discloses a mobile office in which office equipment is mounted on a vehicle.

SUMMARY

The present disclosure is intended to enable a moving object, such as an automobile configured to provide a service, to autonomously travel according to a user's preference or the like.

One aspect of the present disclosure is exemplified by an information processing apparatus including a control unit. The control unit is configured to: provide first information on a service for each of a plurality of moving objects, each of which is configured to provide a different service and autonomous travel; acquire second information on time and location of at least one service that a user wants to use; and determine at least one moving object that matches with the user based on the first information and the second information, and generate a travel plan of the at least one moving object. Another aspect of the present disclosure is also exemplified by an information processing method executed by at least one computer such as the information processing apparatus. Still another aspect of the present disclosure is exemplified by a non-transitory storage medium storing instructions that are executable by one or more processors and cause the one or more processors to execute the information processing method.

According to the present information processing apparatus, it is possible to enable a moving object, such as an automobile configured to provide a service, to autonomously travel according to a user's preference or the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an information processing apparatus according to an embodiment of the present disclosure, an information processing method in the information processing apparatus, and a program will be described referring to drawings.

Figure 1:
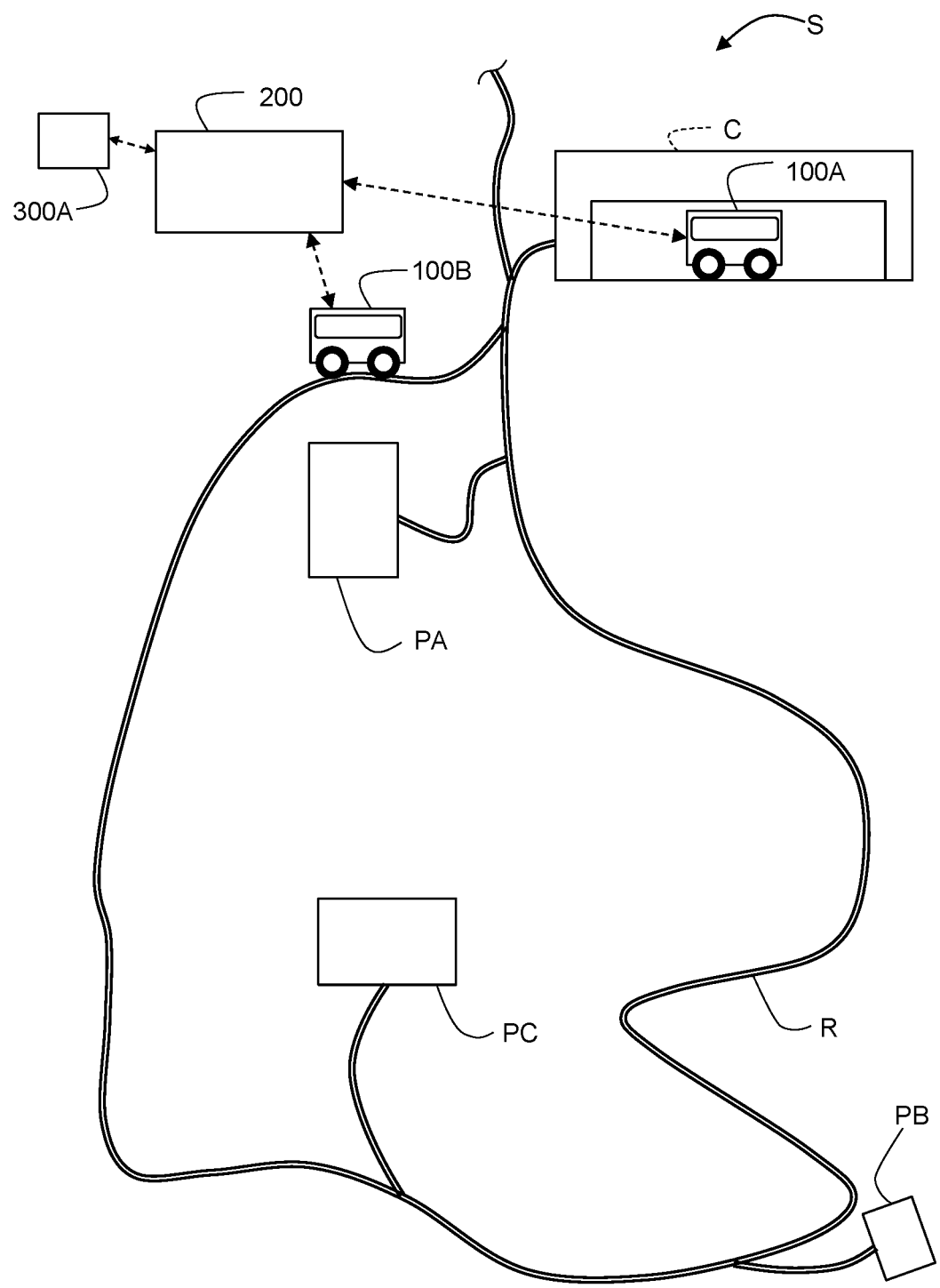
FIG. 1 is a conceptual diagram of an operation of a system according to one embodiment of the present disclosure.

FIG. 1 conceptually shows a service provider system S according to one embodiment of the present disclosure. The service provider system S includes an autonomous vehicle 100 and a server device 200. The autonomous vehicle 100 is one example of a moving object configured to provide a service. The server device 200 is an information processing apparatus and is a computer on a network N. The server device 200 is configured to communicate with each of the autonomous vehicles 100 via the network N, and to cooperate with the information processing apparatus of the autonomous vehicle 100 via the network N. Although FIG. 1 illustrates the autonomous vehicles 100A and 100B, out of the several autonomous vehicles 100 (100A, 100B, 100C, ... ), the number of autonomous vehicles 100 is not limited and may be any number.

Each of the autonomous vehicles 100 can autonomously travel with a user. FIG. 1 illustrates a state in which the autonomous vehicle 100A is waiting at a vehicle center C. In FIG. 1, the autonomous vehicle 100B is autonomously traveling based on a predetermined service plan.

The server device 200 is provided outside the vehicle center C. However, the server device 200 may be provided in the vehicle center C. The server device 200 can communicate with other server devices via the network N. The server device 200 is configured to communicate with each of the autonomous vehicles 100 via the network N, and also to communicate with each of user devices 300 via the network N.

The user device 300 is configured to communicate with the server device 200 via the network N. Although FIG. 1 illustrates the user device 300A only, out of the several user devices 300 (300A, 300B, 300C, ... ), the number of user devices is not limited and may be any number.

The autonomous vehicle 100 is also called an Electric Vehicle (EV) pallet. The autonomous vehicle 100 is a moving object capable of automatic driving and unmanned driving, and having various sizes. For example, autonomous vehicles 100 of various sizes are available, e.g. a range from small vehicles that can load a small amount of packages and only one person, to large vehicles. In particular, in the present embodiment, the autonomous vehicle 100 is configured to provide various services, such as food and drink, childcare, medical care, nursing, and learning. At least one service can be provided by a single autonomous vehicle 100, and more than one service may be provided. The service referred to herein may include a mere transfer, but may be a service other than a transfer.

The autonomous vehicle 100 has a control function for controlling itself, and a communication function. The autonomous vehicle 100 can provide, to a user, functions and services added by the server device on the network N by cooperating with the server device on the network N, in addition to a processing that can be executed by the autonomous vehicle 100 alone. In addition, the autonomous vehicle 100 does not have to be an unmanned vehicle. For example, sales staff, service staff or security staff may board the vehicle. For example, when the service provided by the autonomous vehicle 100 is a food and drink service, chefs or waiters can board the vehicle; and when the service provided by the autonomous vehicle 100 is a childcare service, nursery teachers can board the vehicle. Further, the autonomous vehicle 100 may not necessarily be a vehicle capable of complete autonomous travel. For example, it may be a vehicle in which a person drives or assists driving, depending on a situation.

Further, the autonomous vehicle 100 is configured to communicate with the user device 300 (300A, . . . ) via the network N. The user device 300 accepts an input from a user and an operation equivalent to such an input, and can communicate not only with the server device 200 but also with the autonomous vehicle 100 via the network N. The user device 300 may directly transmit to and receive from the autonomous vehicle 100.

The server device 200 is a device that issues a service command to the autonomous vehicle 100. For example, the server device 200 may transmit, to the autonomous vehicle 100, a service command including a travel plan of when and where a person who wants to board the vehicle, such as the user who desires a service, boards and alights the vehicle.

Figure 2:
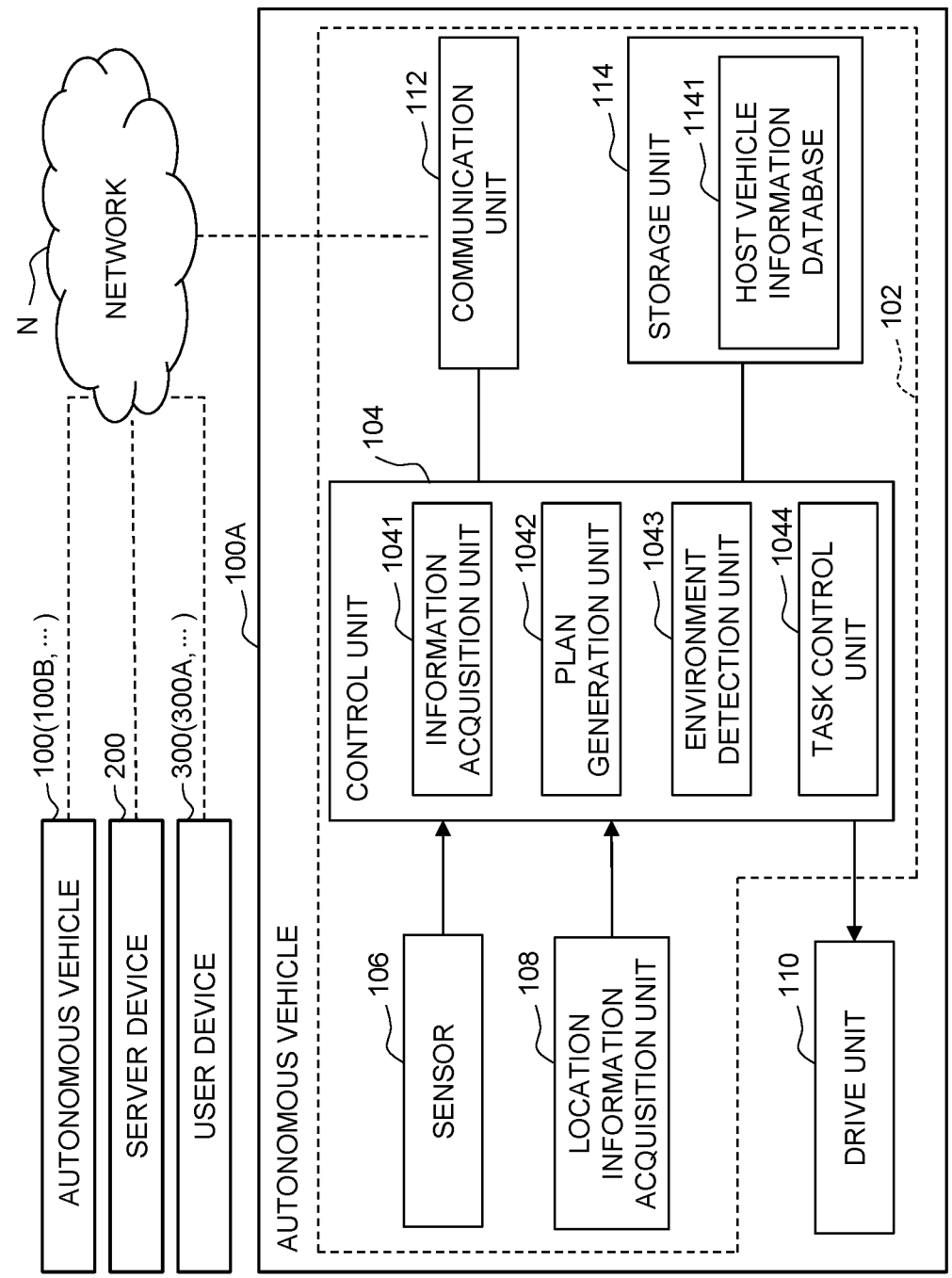
FIG. 2 is a block diagram schematically illustrating a configuration of the system of FIG. 1, particularly illustrating a configuration of an autonomous vehicle.

Each component in the service provider system S of FIG. 1 will be described in detail hereinbelow. FIG. 2 is a block diagram schematically illustrating a configuration of the service provider system S including the autonomous vehicle 100, the server device 200, and the user device 300; in particular, a diagram showing a configuration of the autonomous vehicle 100A. In FIG. 2, a configuration of the autonomous vehicle 100A is shown as one example of the autonomous vehicle 100. Other autonomous vehicles 100B, 100C and the like have the same configuration as that of the autonomous vehicle 100A. A plurality of autonomous vehicles 100 are each configured to provide different services.

The autonomous vehicle 100A in FIG. 2 is provided with an information processing apparatus 102, and includes a control unit 104 that substantially performs functions thereof. The autonomous vehicle 100A can travel based on the service command acquired from the server device 200. In particular, the autonomous vehicle 100A travels in an appropriate manner based on the service command acquired via the network N while detecting the surroundings of the vehicle. The autonomous vehicle 100A provides various services to various users while traveling.

The autonomous vehicle 100A further includes a sensor 106, a location information acquisition unit 108, a drive unit 110, a communication unit 112, and a storage unit 114. The autonomous vehicle 100A operates with electric power supplied from a battery.

The sensor 106 is a unit for sensing the surroundings of the vehicle, which typically includes a stereo camera, a laser scanner, LIDAR (light detection and ranging, or laser imaging detection and ranging), radar, and the like. The information acquired by the sensor 106 is sent to the control unit 104. The sensor 106 includes a sensor that enables a host vehicle to perform autonomous travel. The sensor 106 may also include a camera provided on a body of the autonomous vehicle 100A. For example, the sensor 106 can include an image capturing device using an image sensor such as charged-coupled devices (CCD), a metal-oxide-semiconductor (MOS), and a complementary metal-oxide-semiconductor (CMOS). A plurality of cameras may be provided at a plurality of points on a vehicle body. For example, cameras may be installed on each the front, rear, and left and right sides of the vehicle body.

The location information acquisition unit 108 is a unit that obtains a current location of the vehicle, and typically includes a global positioning system (GPS). The information acquired by the location information acquisition unit 108 is sent to the control unit 104. A GPS receiver, as a satellite signal receiver, receives signals from a plurality of GPS satellites. Each GPS satellite is an artificial satellite that orbits the earth. A satellite positioning system, i.e. navigation satellite system (NSS), is not limited to a GPS. The location information may be detected based on signals from various satellite positioning systems. NSS is not limited to the global navigation satellite system, but may include the Quasi-Zenith Satellite System, such as "Galileo" in Europe and "Michibiki" in Japan, which is integrated with GPS.

The control unit 104 is a computer that controls the autonomous vehicle 100A based on information acquired from the sensor 106, the location information acquisition unit 108 and the like. The control unit 104 is one example of a control unit that receives the service command from the server device 200 and controls traveling of the autonomous vehicle 100A (moving object) and boarding/alighting of various users.

The control unit 104 includes a CPU and a main storage unit, and executes information processing by a program. The CPU is also called a processor. The main storage unit of the control unit 104 is one example of a main storage device. The CPU in the control unit 104 executes a computer program that is deployed so as to be executable in the main storage unit, and provides various functions. The main storage unit in the control unit 104 stores computer programs executed by the CPU, data, and the like. The main storage unit in the control unit 104 is a dynamic random access memory (DRAM), a static random access memory (SRAM), a read only memory (ROM), or the like.

The control unit 104 is connected to the storage unit 114. The storage unit 114 is a so-called external storage unit, which is used as a storage area that assists the main storage unit of the control unit 104, and stores computer programs, data and the like, executed by the CPU of the control unit 104. The storage unit 114 may be a hard disk drive, a solid state drive (SSD), or the like.

The control unit 104 includes an information acquisition unit 1041, a plan generation unit 1042, an environment detection unit 1043, and a task control unit 1044 as functional modules. Each functional module is implemented by executing a program stored in the main storage unit or the storage unit 114, by the control unit 104, that is, the CPU.

The information acquisition unit 1041 acquires information on the service command from the server device 200. The service command includes information on a boarding location (a place where the user boards the vehicle), an alighting location (a place where the user alight the vehicle), a boarding time and an alighting time for the user who wants to use the service provided by the autonomous vehicle 100A or the person who wants to board the autonomous vehicle 100A. Further, the service command may include user information of such a user (for example, a user ID or terminal information of the user device 300 associated with the user). The information acquisition unit 1041 acquires information on a host vehicle, regularly or irregularly, for example, boarding status, and stores such information in a host vehicle information database 1141 of the storage unit 114. The information acquisition unit 1041 also acquires information from the user device 300.

The plan generation unit 1042 generates a service plan of the host vehicle based on the service command acquired from the server device 200, particularly based on the information of the travel plan included in the service command. Moreover, the service plan generated by the plan generation unit 1042 is sent to the task control unit 1044 described later. In the present embodiment, the service plan is data defining a route on which the autonomous vehicle 100A travels and a processing to be performed by the autonomous vehicle 100A over a part or all of the route. Examples of the data contained in the service plan include, for example, the following.

(1) Data Representing the Route on Which the Host Vehicle Travels with a Set of Road Links The route on which the host vehicle travels may be automatically generated based on a given departure point and destination, based on the information of the travel plan included in the service command, with reference to map data stored in the storage unit 114, for example. Alternatively, the route may be generated using an external service.

(2) Data Representing the Processing that the Host Vehicle Should Perform at a Point on the Route The processing performed by the host vehicle on the route may be, for example, but is not limited to, "user boarding", "user alighting" and "provided service".

The environment detection unit 1043 detects an environment around the vehicle based on the data acquired by the sensor 106. Examples of objects to be detected include, but are not limited to, the number or positions of lanes, the number or positions of other vehicles around the subject vehicle, the number or positions of obstacles (for example, pedestrians, bicycles, structures, or buildings) around the subject vehicle, the structure of roads, and road signs. Any detection target may be available as long as it is necessary for autonomous traveling. Further, the environment detection unit 1043 may track the detected object. For example, the relative velocity of the object may be obtained from a difference between previous coordinates of the object detected one step before and current coordinates of the object. Data on the environment (hereinafter referred to as "environment data") detected by the environment detection unit 1043 is sent to the task control unit 1044.

The task control unit 1044 controls operation (traveling) of the host vehicle, which is the moving object, based on the service plan generated by the plan generation unit 1042, the environment data generated by the environment detection unit 1043, and the location information of the host vehicle acquired by the location information acquisition unit 108. For example, the host vehicle is directed to travel along a predetermined route such that the obstacle does not enter a predetermined safety area centered on the host vehicle. A well-known method may be employed as a method for allowing the vehicle to autonomously travel. The task control unit 1044 also executes tasks other than traveling based on the service plan generated by the plan generation unit 1042. Examples of the task may include issuing a user's boarding receipt or boarding pass.

The drive unit 110 is a unit configured to allow the autonomous vehicle 100A to travel based on a command generated by the task control unit 1044. The drive unit 110 may include, for example, a motor for driving wheels, an inverter, a brake, a steering mechanism, a secondary battery, and the like.

The communication unit 112 has a communication unit configured to allow the autonomous vehicle 100A to access the network N. In the present embodiment, the autonomous vehicle 100A can communicate with other devices (for example, the server device 200 or the user device 300) via the network N. Further, the communication unit 112 may further include a communication unit for inter-vehicle communication between the autonomous vehicle 100A (host vehicle) and other autonomous vehicles 100 (100B, . . . ).

Next, the server device 200 will be described. The server device 200 is a device that provides information (hereinafter, "first information") on a service for each of the plurality of autonomous vehicles 100. The server device 200 is a device that acquires, from the user device 300, information (hereinafter, "second information") on the time and location, at which at least one service that the user wants to use will be received. The server device 200 determines at least one autonomous vehicle 100 that matches with the user based on the first information and the second information. Further, the server device 200 is a device that generates a travel plan of the autonomous vehicle 100 in order to provide the service that the user wants to use in the determined autonomous vehicle 100. The server device 200 is a device that generates a service command for the autonomous vehicle 100 (100A, . . . ) based on such a travel plan, and transmits the service command to the determined autonomous vehicle 100.

Figure 3:
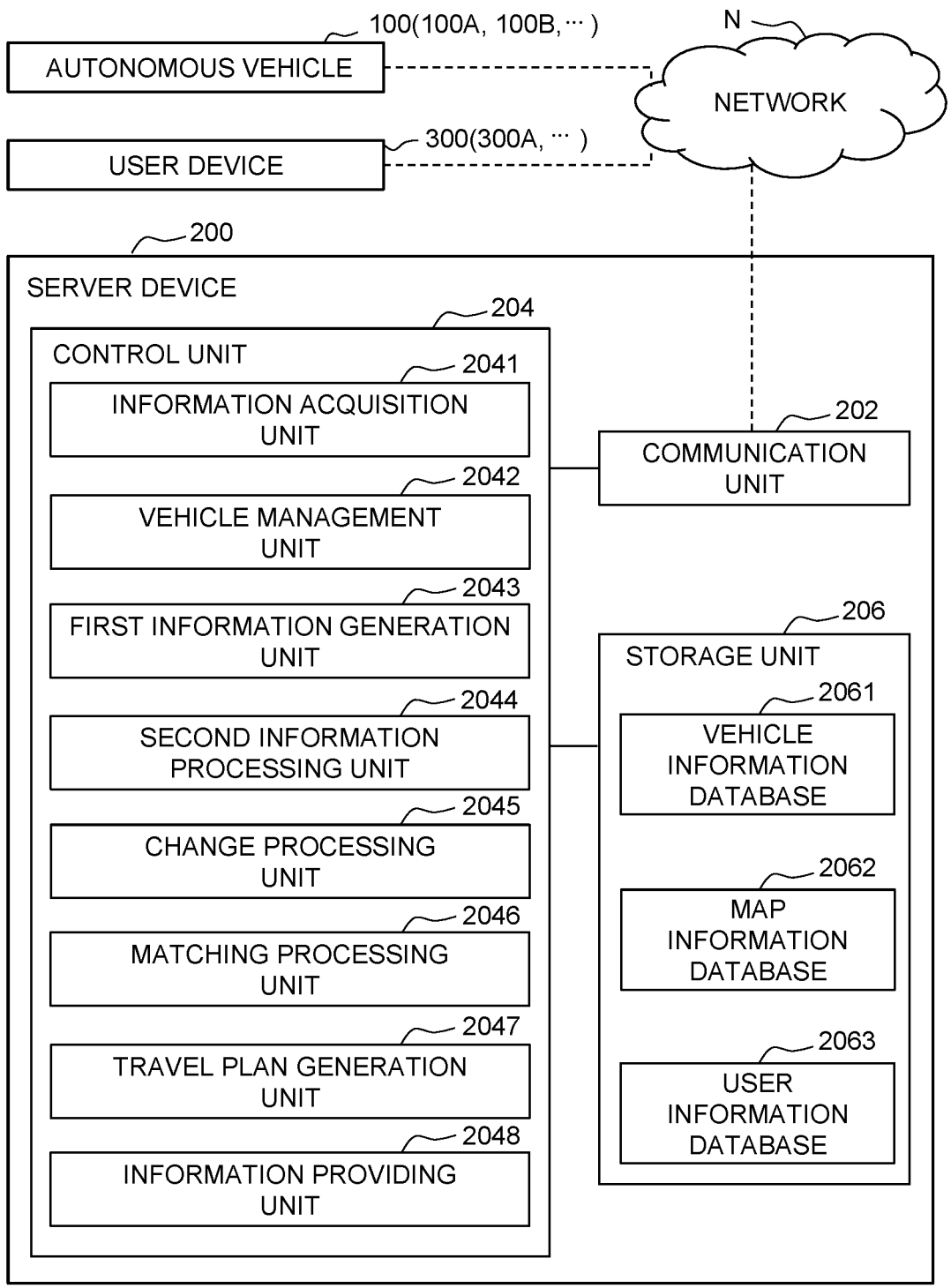
FIG. 3 is a block diagram schematically illustrating a configuration of the system of FIG. 1, particularly illustrating a configuration of a server device.

The server device 200 is the information processing apparatus, and includes a communication unit 202, a control unit 204, and a storage unit 206, as shown in FIG. 3. The communication unit 202 is the same as the communication unit 112 and has a communication function for connecting the server device 200 to the network N. The communication unit 202 of the server device 200 is a communication interface for communicating with the autonomous vehicle 100 and the user device 300 via the network N. The control unit 204 includes a CPU and a main storage unit, and executes information processing by a program, similar to the control unit 104. This CPU is also a processor, and the main storage unit of the control unit 204 is also one example of a main storage device. The CPU in the control unit 204 executes a computer program that is deployed so as to be executable in the main storage unit, and provides various functions. The main storage unit in the control unit 204 stores computer programs executed by the CPU, data, and the like. The main storage unit in the control unit 204 is a DRAM, SRAM, ROM, or the like.

The control unit 204 is connected to the storage unit 206. The storage unit 206 is an external storage unit, which is used as a storage area that assists the main storage unit of the control unit 204, and stores computer programs, data and the like, executed by the CPU of the control unit 204. The storage unit 206 may be a hard disk drive, an SSD, or the like.

The control unit 204 is a unit configured to control the server device 200. As illustrated in FIG. 3, the control unit 204 includes, as functional modules, an information acquisition unit 2041, a vehicle management unit 2042, a first information generation unit 2043, a second information processing unit 2044, a change processing unit 2045, a matching processing unit 2046, a travel plan generation unit 2047 and an information providing unit 2048. Each of these functional modules is implemented by executing a program stored in the main storage unit or the storage unit 206, by the CPU of the control unit 204.

The information acquisition unit 2041 acquires various information from the autonomous vehicle 100 and the user device 300, for example, the second information. The acquired information is transmitted to the vehicle management unit 2042, the second information processing unit 2044, the change processing unit 2045, or the travel plan generation unit 2047. Further, the information acquisition unit 2041 periodically acquires, from the autonomous vehicle 100, location information, information of the host vehicle information database 1141 and the like, and transmits such information to the vehicle management unit 2042.

The vehicle management unit 2042 manages information from the plurality of autonomous vehicles 100 that are under management. In particular, the vehicle management unit 2042 receives information such as data on the autonomous vehicle 100 from the plurality of autonomous vehicles 100 via the information acquisition unit 2041 and stores such information in a vehicle information database 2061 of the storage unit 206 at predetermined intervals. The location information and the vehicle information are used as information on the autonomous vehicle 100. Examples of the vehicle information include, but are not limited to, identifier, usage/class, information on a standby point (garage or sales office), door type, vehicle body size, luggage compartment size, loading capacity, distance capable of traveling when fully charged, distance capable of traveling currently, current status, and the like, of the autonomous vehicle 100. The current status includes information such as the user's boarding status and provided service status. Further, the vehicle information database 2061 also includes information on the travel plan generated for each autonomous vehicle 100.

The first information generation unit 2043 generates a service schedule for the services provided by the autonomous vehicles 100 that are under control based on the data of the vehicle information database 2061, according to a predetermined program, and provides (distributes, herein) the first information on the service for each of the plurality of autonomous vehicles 100. The first information includes information on an area to be traveled (hereinafter, travel area information), together with the type and details of the service to be provided by each autonomous vehicle 100. The travel area information may include addresses, road names, stations names, and the like. The first information may include at least one of a seating capacity or travel time of each autonomous vehicle 100. Further, the first information may include map information on the travel area information extracted based on a map information database 2062 of the storage unit 206. The first information generation unit 2043 transmits, upon distribution of the first information, the first information to the information providing unit 2048, thereby providing the first information to the user device 300 of the registered user based on the user information database of the storage unit 206. The provided first information is stored in the vehicle information database 2061 so as to be searchable. The first information may be provided by posting the first information on a predetermined website. The predetermined website may be configured to be accessible only by registered users, or may be configured to be accessible by everyone.

The second information processing unit 2044 processes the second information acquired from the user device 300 via the information acquisition unit 2041. The second information is information on a time and location of at least one service that the user wants to use, preferably including information on the type and details of the service, and a boarding location/alighting location/boarding time/alighting time of the person who wants to board at least one moving object. The second information is acquired from the user device 300 and includes information identifying the user, for example, a user ID and information of the user device 300. The second information processing unit 2044 refers to data of the user information database 2063 of the storage unit 206, extracts service usage history data of the user if necessary, and processes the second information to have a format suitable for processing in the matching processing unit 2046.

The change processing unit 2045 reflects, when at least one autonomous vehicle 100 is matched with the user and when the travel plan is provided for each vehicle and then the travel plan of one autonomous vehicle 100 is changed, changes in various relevant data, for example, in the travel plan of other autonomous vehicles 100. For example, when an alighting time of the user who is boarding the autonomous vehicle 100 is changed, the change processing unit 2045 acquires and associates change information with the travel plan already generated, and transmits such information to the travel plan generation unit 2047.

The matching processing unit 2046 matches the autonomous vehicle 100 to the user who desires the service based on the information received via the second information processing unit 2044, i.e. the second information, and the first information stored in the vehicle information database 2061. More specifically, the first information of the vehicle information database 2061 is searched based on the boarding location, the alighting location, the boarding time and the alighting time of the person who wants to board the vehicle of the service desired by the user, in order to find the autonomous vehicle 100 that matches with such locations and times, and determines at least one autonomous vehicle 100 that matches with the user. As described above, in the present embodiment, "matching" can be exemplified as when a concept (such as a user's desire) matches with another concept (such as functions or services provided by the autonomous vehicle 100). A single user may be matched with a single autonomous vehicle 100 or with several autonomous vehicles 100. For example, when the user provides, as the second information, information on a service that the user wants to receive and information on a service of caring for a child while the user him/herself is receiving the service, two autonomous vehicles 100 can be matched with the user. More specifically, it may be case where the user desires a babysitting or childcare service while he/she wants to consume food and drink, for example, an alcohol serving service.

The travel plan generation unit 2047 generates a travel plan of the autonomous vehicle 100 matched with the user by the matching processing unit 2046, in order to allow the user to board the matched autonomous vehicle 100 and to provide the service to the user, while adjusting a service providing schedule for other users. The travel plan includes a boarding location, an alighting location, a boarding time and an alighting time, which are desired by the user. However, those locations and times do not always have to match with those of the second information from the user, i.e. locations and times may be slightly deviated. The travel plan thus generated is transmitted to the corresponding autonomous vehicle 100 via the information providing unit 2048.

The information providing unit 2048 provides the first information generated by the first information generation unit 2043 to the user device 300, and provides the travel plan generated by the travel plan generation unit 2047 to the autonomous vehicle 100. When the travel plan is provided to the autonomous vehicle 100, a service command including the information of the travel plan is generated and provided to the autonomous vehicle 100. For providing the information and the plan, the information providing unit 2048 refers to the vehicle information database 2061 and the user information database 2063, of the storage unit 206.

Next, the user device 300 will be described hereinbelow. The user device 300 may be, for example, a mobile terminal, a smartphone, a personal computer, or the like. The user device 300A shown in FIG. 4, as an example, has a communication unit 302, a control unit 304, and a storage unit 306. The communication unit 302 and the storage unit 306 of the user device 300A are the same as the communication unit 202 and the storage unit 206 of the server device 200, respectively. Furthermore, the user device 300A includes a display unit 308 and an operation unit 310. The display unit 308 may be, for example, a liquid crystal display or an electroluminescence panel. The operation unit 310 may be, for example, a keyboard, a pointing device, or the like. More specifically, in the present embodiment, the operation unit 310 includes a touch panel, and is substantially integrated with the display unit 308.

The control unit 304 includes a CPU and a main storage unit, similar to the control unit 204 of the server device 200. The CPU of the control unit 304 executes an application program (hereinafter, "application") 3061 stored in the storage unit 306. The application 3061 is an application program for accessing information distributed from a web browser or the server device 200. The application 3061 has a GUI, accepts an input by the user (for example, access), and transmits the input to the server device 200 via the network N. The user can input the second information on the time and location at which the service that the user wants to use will be received, and transmits such information to the server device 200, via the user device 300. The second information can include information on the service itself, such as the type and details of the service that the user wants to use. For example, when the service desired by the user is medical care, a site or symptom for which diagnosis is desired may be included in the second information. When the service desired by the user is food and drink, a specific dish name may be included in the second information.

Figure 4:
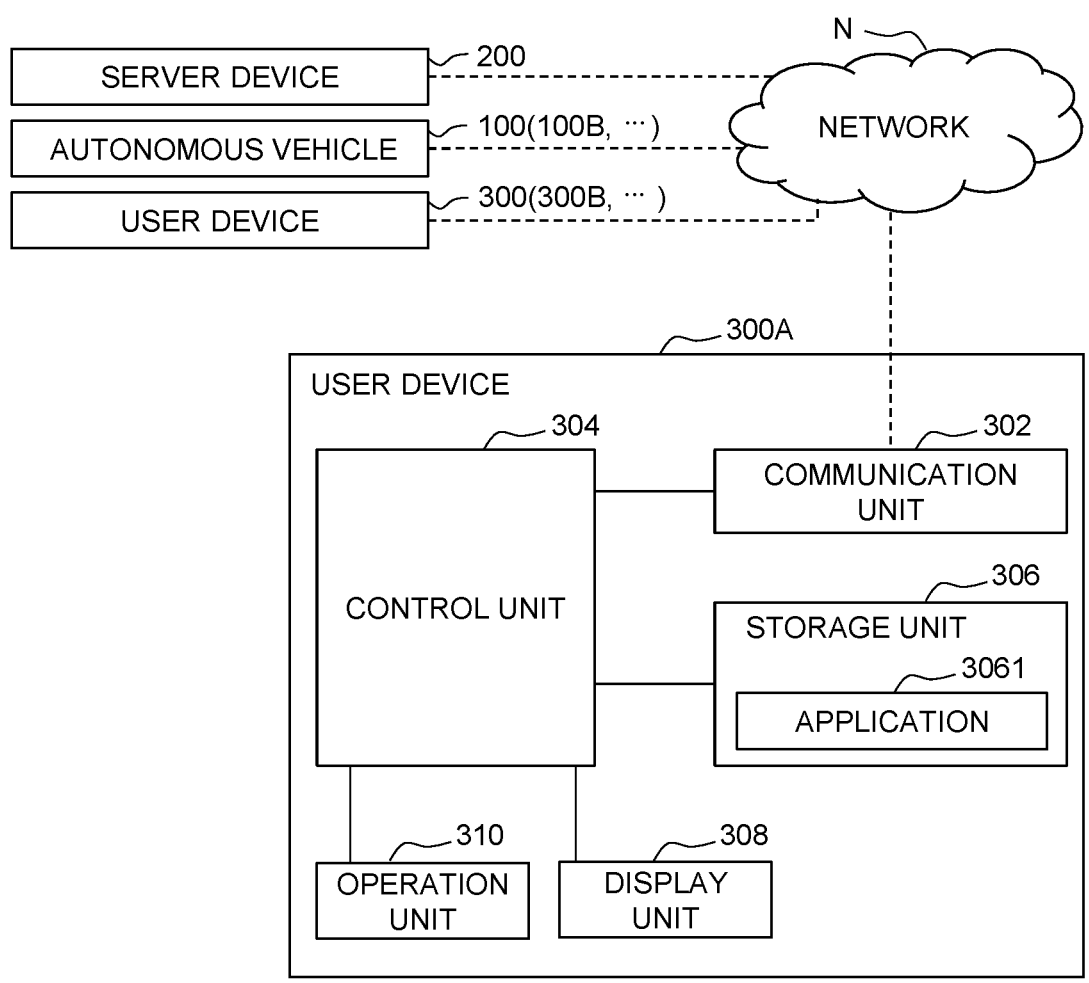
FIG. 4 is a block diagram schematically illustrating a configuration of the system of FIG. 1, particularly illustrating a configuration of a user device.

Moreover, in FIGS. 2, 3 and 4, the autonomous vehicle 100, the server device 200 and the user device 300 are connected by the same network N. However, this connection may be implemented by a plurality of networks. For example, a network that connects the autonomous vehicle 100 and the server device 200 and a network that connects the server device 200 and the user device 300 may be different networks.

A processing in the service provider system S having the configuration stated above will be described hereinbelow. The input of the desired service in the user device 300 will be described based on FIG. 5. Hereinbelow, a terminal device of a user U is the user device 300A.

Figure 5:
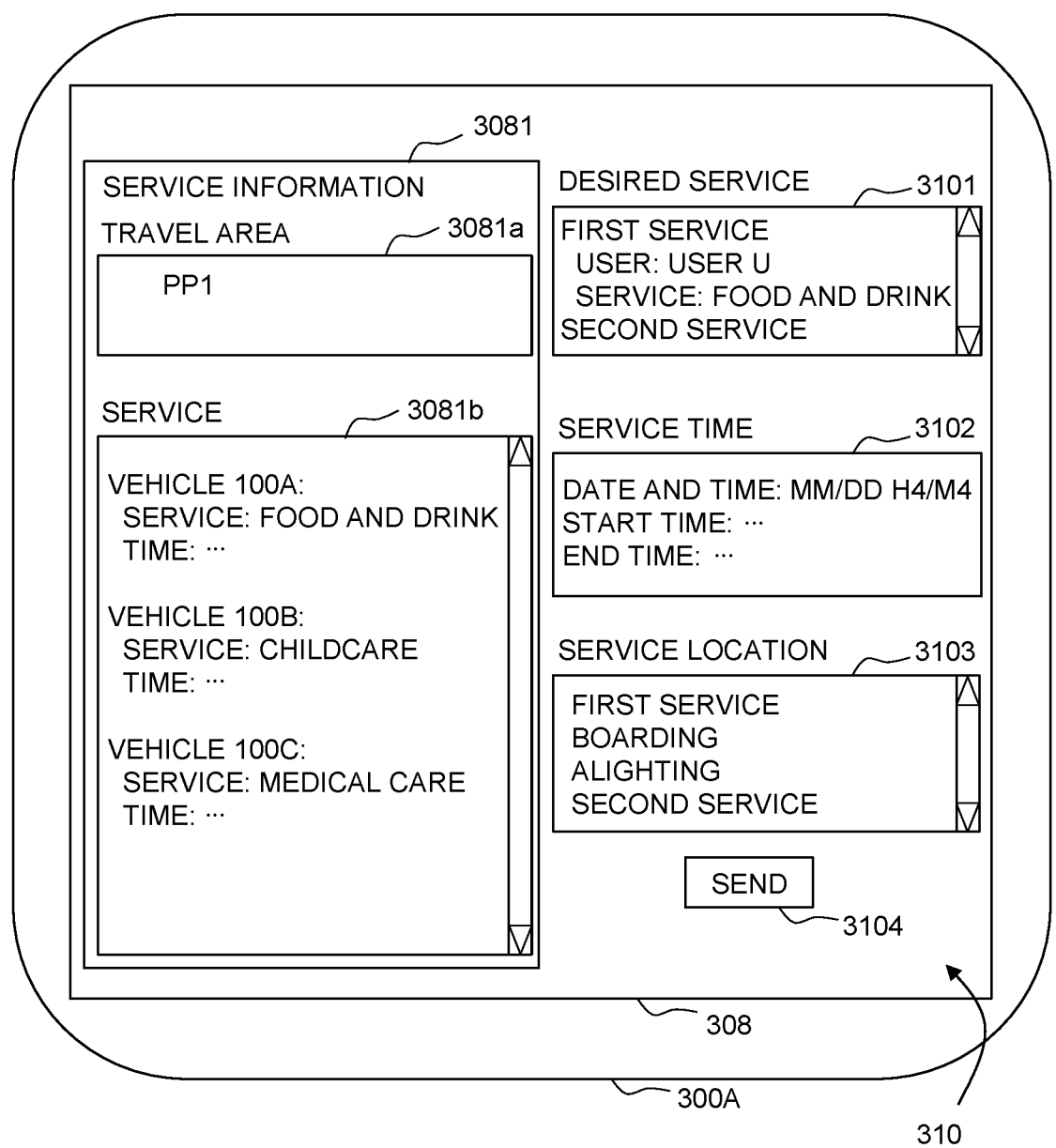
FIG. 5 is a diagram illustrating a display example of a display unit of the user device shown in FIG. 4.

FIG. 5 is one example of a screen of the display unit 308 of the user device 300A when the application 3061 is executed. The display unit 308 also corresponds to the operation unit 310 as a touch panel. A service information column 3081 on the display unit 308 of the user device 300A of the user U displays the first information provided from the server device 200, i.e. information on the service for each autonomous vehicle 100. The service information column 3081 includes a travel area column 3081a and a service column 3081b. The user U sets the travel area to a desired area in the travel area column 3081a, and information on the services available in the set travel area is displayed on the service column 3081b. In FIG. 5, as services available in a travel area PP1 where a home PB of the user U is located, a food and drink service provided by the autonomous vehicle 100A and a service available time; a childcare service provided by the autonomous vehicle 100B and a service available time; and a medical care service provided by the autonomous vehicle 100C and a service available time are displayed. Such information is provided from the server device 200 at a predetermined time according to a predetermined program.

When the user U sees the service information column 3081 on the display unit 308 of the user device 300A and finds a desired service, the user U inputs the service that he/she wants to use in a desired service column 3101. The user U may input a vehicle number in the desired service column 3101, for example, "100A" indicating the autonomous vehicle 100A providing the food and drink service. A date and time at which the user wants to use the service is input in a service time column 3102. A start time and end time are shown in FIG. 5, which respectively correspond to the boarding time and the alighting time. Further, a location where the service is received, specifically the boarding location and the alighting location, is input in a service location column 3103. In FIG. 5, "food and drink" is input as a first service in the desired service column 3101 and "childcare" as a second service (not shown). As a person who actually wants to use the service, i.e. a person who wants to board the vehicle, the "user U" is input for the first service, and the "child of the user" for the second service. The user U can fill the desired service column 3101, the service time column 3102 and the service location column 3103, and then press a send button 3104. Thereby, the input information, i.e. the second information, is transmitted from the user device 300A to the server device 200 (see FIG. 1).

Figure 6:
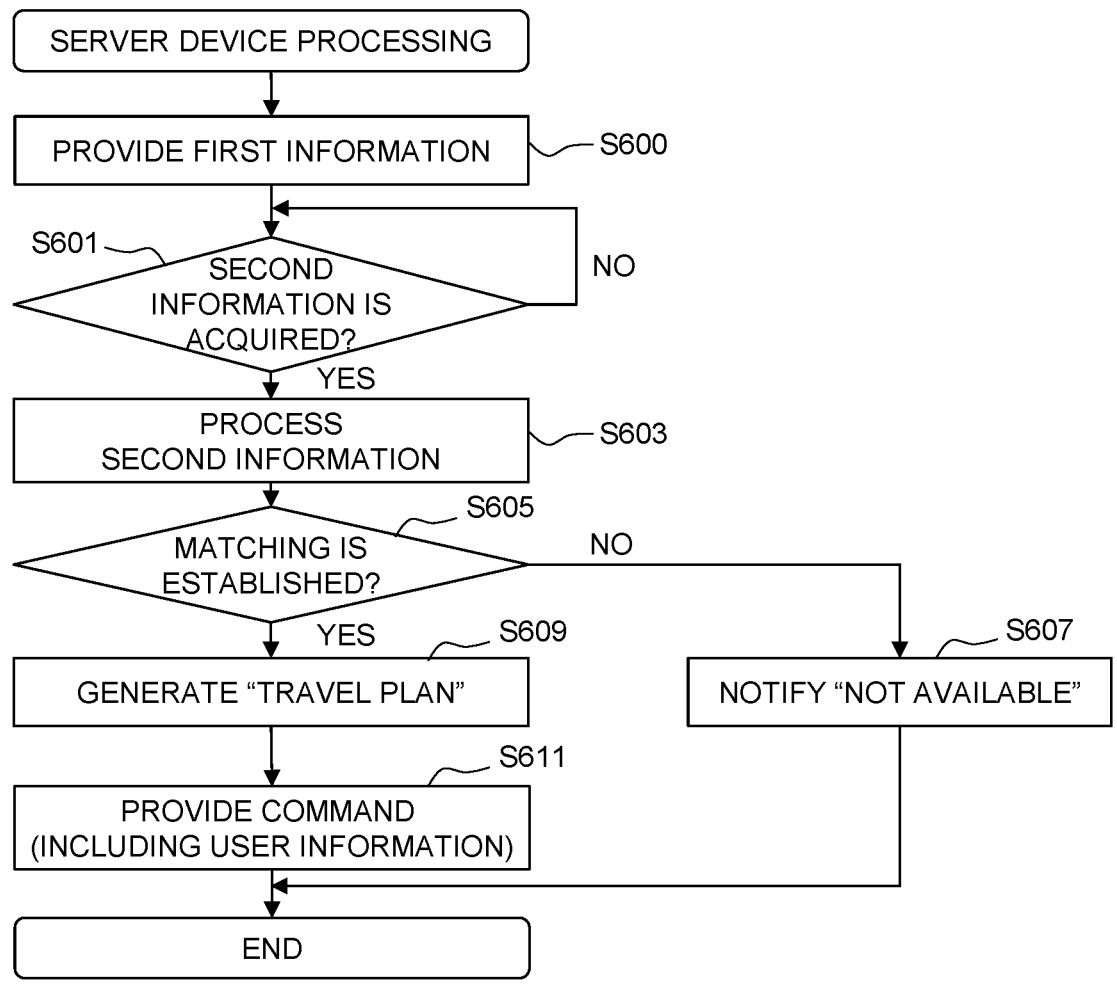
FIG. 6 is a flowchart of a processing of the server device in the system of FIG. 1.

The processing in the server device 200 will be described based on a flowchart in FIG. 6. As described above, the first information is provided from the server device 200 to the user devices 300 (300A, . . . ) (step S600). The information on the desired service, i.e. the second information from the user device 300A is acquired by the information acquisition unit 2041 of the control unit 204 of the server device 200 (YES in step S601). Then, the acquired second information is transmitted to the second information processing unit 2044.

The second information processing unit 2044 processes the acquired second information to have a format suitable for processing in the matching processing unit 2046 (step S603). Specifically, the second information is transmitted from the user device 300A and includes the user information of the user U. The second information processing unit 2044 makes up for the second information so as to enable more suitable matching processing, for example, by extracting and referring to the service usage history data of the user U based on the user information. In a case where user preference information, previously registered by the user U, is stored in the storage unit 206, the user preference information may be added to the second information. Such a processing in the second information processing unit 2044 may be omitted and the second information may be directly transmitted to the matching processing unit 2046.

The processed second information is transmitted to the matching processing unit 2046, and the matching processing is executed. Specifically, the autonomous vehicle 100 that will provide the service matched with the second information of the user U is determined by comparing the second information of the user U with the first information of the autonomous vehicle 100. When the matching is not established since a service use time is not matched (NO in step S605), the matching processing unit 2046 transmits a result of the matching processing to the information providing unit 2048 such that a notification of "not available" is transmitted to the user device 300A (step S607). The user device 300A, which has received the "not available" notification, can input the information for finding another service.

Meanwhile, when the matching is established (YES in step S605), the matching processing unit 2046 transmits the result to the travel plan generation unit 2047 together with the second information. Thereby, the travel plan generation unit 2047 generates a travel plan of the autonomous vehicle 100 which has been matched with the user U (step S609). The information providing unit 2048 transmits a service command including information of the generated travel plan to the autonomous vehicle 100 for which the matching has been established (step S611). The service command at this time includes the user information of the user U.

As described above, the user U transmits to the server device 200 a request to use the service in which the "food and drink" service is the first service and the "childcare" service is the second service. The user U inputs the request to use the service after reading the service information column 3081. Therefore, the autonomous vehicle 100A is determined as a first moving object that provides the first service, and the autonomous vehicle 100B is determined as a second moving object that provides the second service (YES in step S605). The person who wants to board the autonomous vehicle 100A is the user U, and the person who wants to board the autonomous vehicle 100B is the child of the user U. The travel plan for each of the autonomous vehicles 100A and 100B is generated (step S609). The service command including the generated travel plan is transmitted to the corresponding autonomous vehicles 100A and 100B (refer to FIG. 1) (step S611). As stated above, the service command at this time includes the user information of the user U.

Figure 7:
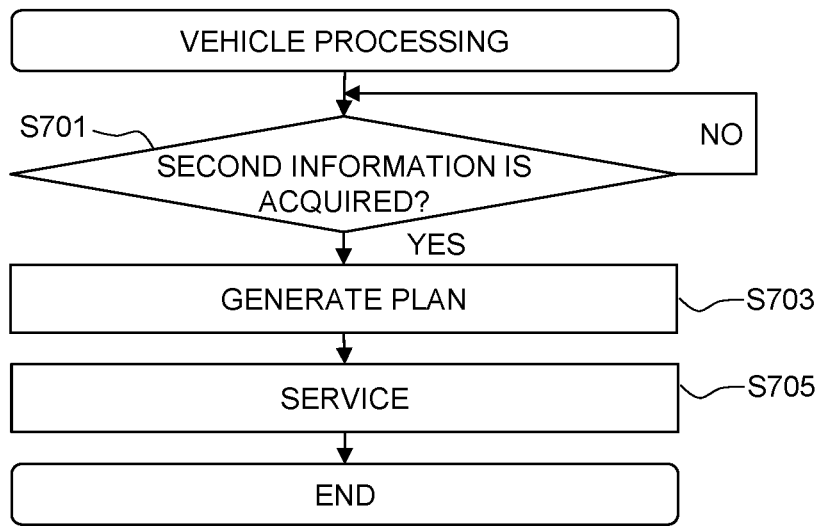
FIG. 7 is a flowchart of a processing of the autonomous vehicle in the system of FIG. 1.

A processing of the autonomous vehicle 100A that has received the service command will be described referring to a flowchart of FIG. 7. A processing of the autonomous vehicle 100B that has received the service command is substantially the same as that of the autonomous vehicle 100A, and thus descriptions will be omitted.

The information acquisition unit 1041 of the control unit 104 of the autonomous vehicle 100A acquires the service command from the server device 200 (YES in step S701). The plan generation unit 1042 of the control unit 104 generates a service plan based on the information of the travel plan of the service command (step S703). The plan generation unit 1042 basically generates the service plan based on the travel plan, but also in consideration of road conditions at any given time, for example, traffic restriction information. The task control unit 1044 of the control unit 104 of the autonomous vehicle 100A operates based on the service plan (step S705).

Since FIG. 1 roughly corresponds to the travel area PP1, further description will be made referring to FIG. 1. The user U can board the autonomous vehicle 100A at the boarding time at a station PA, which is the boarding location, for example, on the way home from work. The autonomous vehicle 100A that the user U boards can travel on a road R to approach the desired alighting location while the user U rides the vehicle. The home PB of the user U is set as the alighting location of the user U.

A school PC is set as the boarding location for the child of the user U. The autonomous vehicle 100B picks up the child at the school PC at the boarding time, which may be, for example, a time for leaving school, and allows the child to board the vehicle. A nursery teacher also boards the autonomous vehicle 100B. The autonomous vehicle 100B also travels on the road R to carry the child to the home PB of the user U, which is the alighting location, and to drop off the child at the alighting time. Further, a time when the child alights the autonomous vehicle 100B is set to be later than a time when the user U alights the autonomous vehicle 100A. This is because the user U input such times, and it is also appropriate in terms of childcare.

The user device 300A of the user U directly communicates with the autonomous vehicle 100A that the user U will board before the boarding time. This allows the user U to board the autonomous vehicle 100A without loss of time. Moreover, the user device 300A of the user directly receives a notification that the child of the user U boards the autonomous vehicle 100B. Therefore, the user U can enjoy the service provided by the autonomous vehicle 100A without having to worry about his/her child. As described above, since the user information of the user U is transmitted to the autonomous vehicles 100A and 100B together with the service command, such notifications can be transmitted to the user device 300A of the user U. However, in a case where the user information of the user U is exchanged between the autonomous vehicles 100A and 100B, or in a case where the information is provided from one autonomous vehicle to the other autonomous vehicle and then the other autonomous vehicle provides such information to the user device 300A of the user U based on the user information, the user information of the user U may be provided only to at least one of the autonomous vehicles 100A and 100B, for example, only to the autonomous vehicle 100A that the user U boards.

Figure 8:
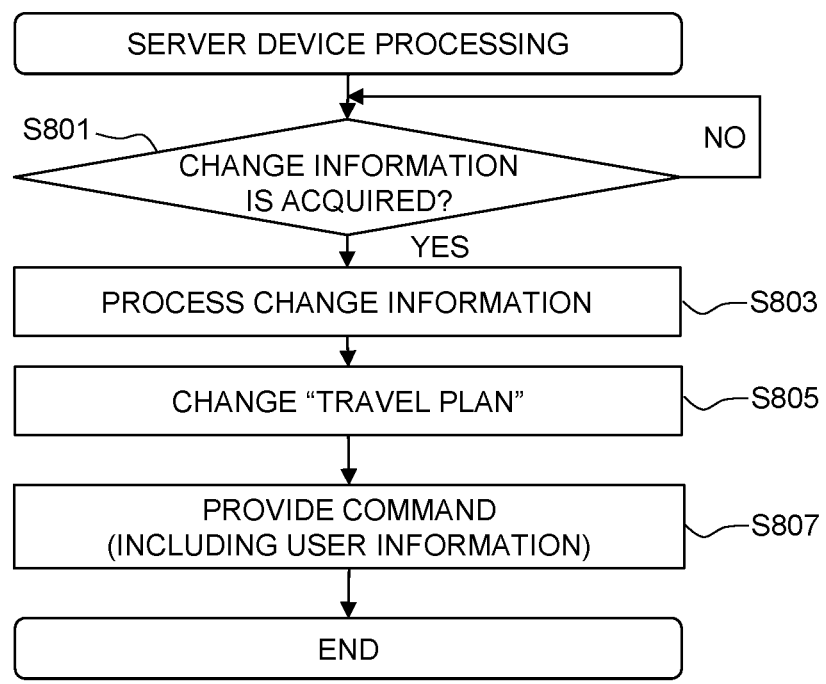
FIG. 8 is a flowchart of a processing of the server device in the system of FIG. 1.

A case where, in the autonomous vehicle 100A, the user U overruns his/her meal schedule for various reasons and cannot alight the autonomous vehicle 100A at the predetermined alighting time will be described based on the flowchart of FIG. 8.

For example, when it is confirmed that the alighting time of the user U is changed via an input device in the autonomous vehicle 100A or the user device 300A of the user U, or by an automatic monitoring device of the boarding user in the autonomous vehicle 100A, change information is transmitted to the server device 200 from the autonomous vehicle 100A or the user device 300A. Thereby, the change information of the user U is acquired by the information acquisition unit 2041 of the control unit 204 of the server device 200 (YES in step S801). This change information may include a new alighting time after changing.

The acquired change information is transmitted to the change processing unit 2045. The change processing unit 2045 performs a processing in which the change information is associated with the existing travel plans of the autonomous vehicles 100A and 100B (step S803). The processed change information is transmitted to the travel plan generation unit 2047.

The travel plan generation unit 2047 executes a processing in which the change information is reflected in the travel plan, i.e. the travel plan is changed (step S805). The travel plan of the autonomous vehicle 100A, which is related to the user U, and the travel plan of the autonomous vehicle 100B, which is related to the child of the user U, are respectively changed so as to change travel plans of other users who have gotten on or will board the autonomous vehicles 100A and 100B, excluding the user U, as little as possible. Then, the changed travel plan is transmitted to the corresponding autonomous vehicles 100A and 100B.

The child can alight the vehicle at the home PB of the user U after the user U alights. Therefore, the user U can enjoy a productive time while the child's safety is assured.

As described above, according to the service provider system S, it is possible to accept a request for a service from the user who is aware of information on the services provided by the plurality of autonomous vehicles 100, and match the appropriate autonomous vehicle 100 with the user. Therefore, it is possible to enable the autonomous vehicle 100 configured to provide a service to autonomously travel considering the user's preference or the like.

The embodiments stated above are mere examples, and the present disclosure can be implemented with appropriate modifications within a scope not departing from the gist thereof. The processing and units described in the present disclosure can be freely combined and implemented unless technical contradiction occurs.

Further, the processing described as being performed by a single device may be executed in a shared manner by a plurality of devices. For example, the server device 200 (information processing apparatus) and the information processing apparatus 102 of the autonomous vehicle 100 need not be a single computer, and may be configured as a system including several computers. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments in a computer, and reading and executing the program by one or more processors included in the computer. Such a computer program may be provided to the computer by a non-transitory computer-readable storage medium connectable to a computer system bus, or may be provided to the computer via the network. Examples of the non-transitory computer-readable storage media include random disk (such as a magnetic disk (floppy (registered trademark) disk, hard disk drive (HDD), and the like) or optical disc (CD-ROM, DVD disc, Blu-ray disc, and the like)), read-only memory (ROM), random access memory (RAM), EPROM, EEPROM, magnetic card, flash memory, optical card, and random types of medium suitable for storing electronic instructions.

What is claimed is:

1. An information processing apparatus comprising:
one or more processors configured to:
provide first information on a service for each of a plurality of moving objects, each of which being configured to provide a different service and autonomous travel;
acquire second information on time and location of at least one service that a user wants to use;
determine at least one of the plurality of moving objects that matches with the user based on the first information and the second information, and generate a travel plan of the at least one moving object; and
after a first of the moving objects and a second of the moving objects are matched with the user and the travel plan is provided for each of the first moving object and the second moving object, change, in response to a change in the travel plan of the first moving object, the travel plan of the second moving object such that the travel plan of the second moving object corresponds to the changed travel plan of the first moving object.

2. The information processing apparatus according to claim 1, wherein:
the first information includes travel area information of each of the moving objects; and
the second information includes information on a boarding location, an alighting location, a boarding time and an alighting time of a person who wants to board the at least one moving object.

3. The information processing apparatus according to claim 1, wherein the change in the travel plan of the first moving object is caused by changing the second information based on a request from the user.

4. The information processing apparatus according to claim 1, wherein the one or more processors are configured to:
acquire the second information from an input by the user, reflect, in the acquired second information, data of at least one service that has been used by the user, and
determine the at least one moving object based on the first information and the second information in which the data has been reflected.

5. The information processing apparatus according to claim 1, further comprising a storage device configured to store preference information about a preference of the user registered by the user, wherein the one or more processors are configured to:
acquire the second information from an input by the user, add the preference information of the user to the acquired second information, and
determine the at least one moving object based on the first information and the second information to which the preference information of the user has been added.

6. The information processing apparatus according to claim 1, wherein the one or more processors are configured to provide, when the first moving object and the second moving object are matched with the user and when the travel plan is provided for each of the first moving object and the second moving object, user information of the user to at least one of the first moving object and the second moving object to enable direct communication with a user device of the user matched with at least one of the first moving object and the second moving object.

7. An information processing method executed by at least one computer, the information processing method comprising:
providing first information on a service for each of a plurality of moving objects, each of which being configured to provide a different service and autonomous travel;
acquiring second information on time and location of at least one service that a user wants to use;
determining at least one of the plurality of moving objects that matches with the user based on the first information and the second information, and generating a travel plan of the at least one moving object; and
after a first of the moving objects and a second of the moving objects are matched with the user and the travel plan is provided for each of the first moving object and the second moving object, changing, in response to a change in the travel plan of the first moving object, the travel plan of the second moving object such that the travel plan of the second moving object corresponds to the changed travel plan of the first moving object.

8. The information processing method according to claim 7, wherein:
the first information includes travel area information of each of the moving objects; and
the second information includes information on a boarding location, an alighting location, a boarding time and an alighting time of a person who wants to board the at least one moving object.

9. The information processing method according to claim 7, further comprising:
providing, when the first moving object and the second moving object are matched with the user and when the travel plan is provided for each of the first moving object and the second moving object, user information of the user to at least one of the first moving object and the second moving object to enable direct communication with a user device of the user matched with at least one of the first moving object and the second moving object.

10. A non-transitory storage medium storing instructions that are executable by one or more processors and cause the one or more processors to execute functions comprising:

providing first information on a service for each of a plurality of moving objects, each of which being configured to provide a different service and autonomous travel;

acquiring second information on time and location of at least one service that a user wants to use;

determining at least one of the plurality of moving objects that matches with the user based on the first information and the second information, and generating a travel plan of the at least one moving object; and after a first of the moving objects and a second of the moving objects are matched with the user and the travel plan is provided for each of the first moving object and the second moving object, changing, in response to a change in the travel plan of the first moving object, the travel plan of the second moving object such that the travel plan of the second moving object corresponds to the changed travel plan of the first moving object.

* * * * *